United States Patent

Patti

[11] Patent Number: 5,845,887
[45] Date of Patent: Dec. 8, 1998

[54] ADJUSTABLE HOLE BRACKET

[76] Inventor: Tony Patti, 13920 Mt. McClellan Blvd., Reno, Nev. 89506

[21] Appl. No.: 914,866

[22] Filed: Aug. 19, 1997

[51] Int. Cl.⁶ .................................................. A47B 96/06
[52] U.S. Cl. ...................................... 248/301; 248/229.16
[58] Field of Search .................................. 248/300, 301, 248/224.8, 229.16, 229.26, 228.7, 228.2, 229.21, 903; 403/397

[56] References Cited

U.S. PATENT DOCUMENTS

| | | | |
|---|---|---|---|
| 2,316,389 | 4/1943 | Atkinson | 248/300 |
| 4,005,942 | 2/1977 | Gilb | 248/903 X |
| 5,619,263 | 4/1997 | Laughlin et al. | 248/229.16 X |

*Primary Examiner*—Ramon O. Ramirez
*Attorney, Agent, or Firm*—Ian F. Burns

[57] ABSTRACT

A hole bracket comprising two or more bracket members. Each bracket member comprises a hook for engaging an edge of a hole, a tab for inserting into a tab hole on another bracket member and a tab hole for receiving a tab from another bracket member. The hole bracket is assembled by interlocking the tabs and holes of the bracket members. An object hole may be provided in each bracket member for receiving an object that is to be attached to the hole bracket.

26 Claims, 3 Drawing Sheets

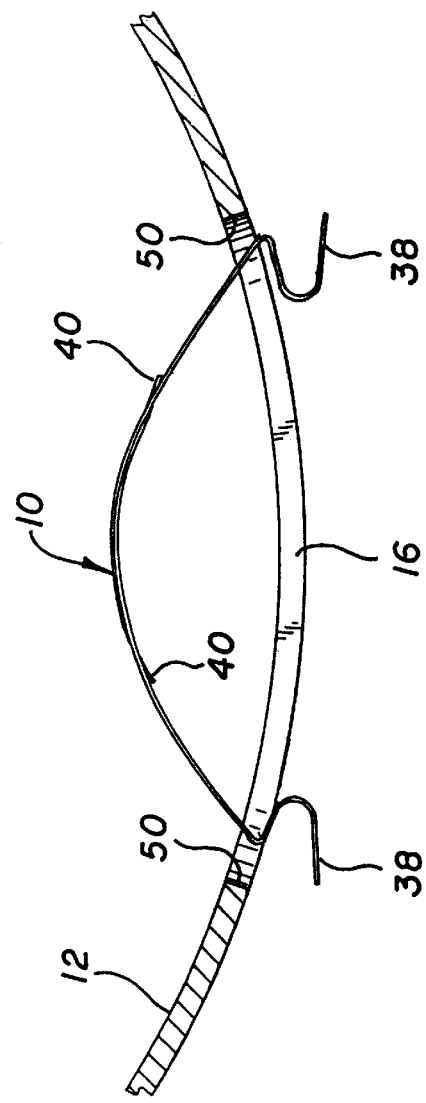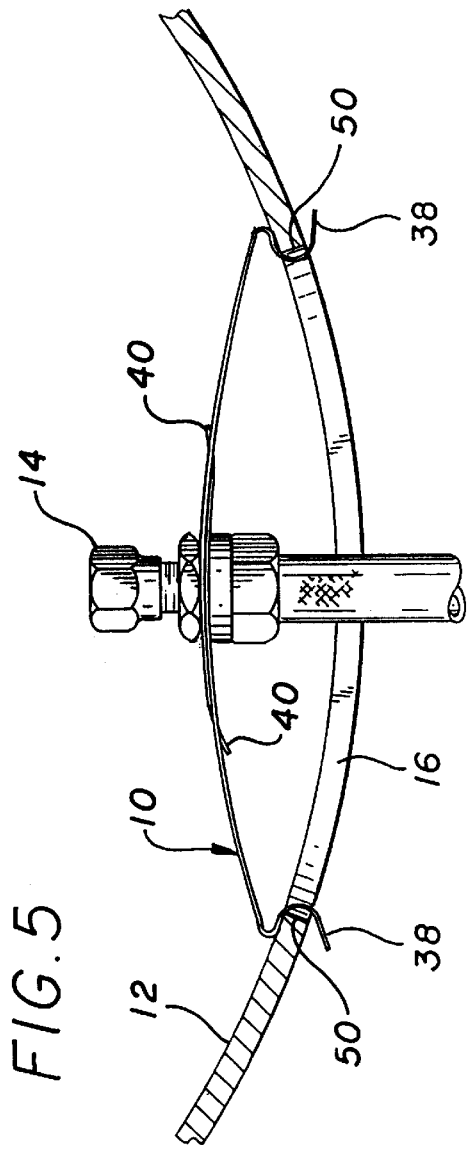

ADJUSTABLE HOLE BRACKET

BACKGROUND OF THE INVENTION

1. Field of Invention

This invention relates to an adjustable hole bracket for holding and supporting objects in a hole. The hole bracket is particularly well adapted for use on vehicle wheels.

2. Description of Related Art

Large vehicles often use dual wheels to support heavy loads and provide greater traction. Dual wheel assemblies comprise two wheels; an inner and outer wheel. Both wheels are connected together and the assembly is attached to an axle of a vehicle. One of the problems associated with dual wheels is that it is difficult to access the valve stem of the inner wheel. As is the case with most vehicles, it is important to be able to access the valve stems of dual wheels to monitor and adjust tire pressure. Because the inner wheel is underneath the vehicle and behind the outer wheel, the valve stem may be difficult for a user to reach. Hand holes or access holes may be provided in the dual wheel for allowing a user to reach through the wheels to the inner wheel valve stem. However, reaching through the wheels to check or adjust tire pressure is an inconvenient, dirty, and uncomfortable task.

To address these problems, air hoses and valve extenders have been developed to effectively extend the valve stems of both the inner and outer wheels. Valve extenders are well known in the art and they allow users to monitor and adjust tire pressure from a more convenient location. When attached to an inner wheel, a valve extender passes through one or more hand holes in the dual wheel assembly.

Valve extenders must be anchored or held in place in order to prevent them from being damaged when the vehicle is in motion. If a valve extender is not anchored, it may flop around and become damaged or cause damage to the wheel. Furthermore, the valve extender may fall back through hand holes thereby forcing a user to reach through the hand hold to retrieve it and defeating its purpose. It is therefore important to hold and support valve extenders in hand holes to prevent their movement.

It is also highly desirable for the valve extender to be supported in such a way that a user may press on the extender to operate the valve. Tire pressure gauges and compressed air hoses require the user to press on the valve extender to engage the extender and operate the air valve. Some extenders, gauges, and air hoses require the application of a considerable amount of force. If the valve extender is not supported to resist this force, the user may be unable to engage the extender.

There are many other applications in which it is important to support objects in holes of various structures. For example, it is often necessary to support electrical cables as they pass through an opening in a wall. If the cable is not properly supported it may be damaged by the edge of the hole or interfere with other objects.

SUMMARY OF INVENTION

1. Objects of the Invention

In view of the above, it is a primary objective of the present invention to provide a hole bracket for holding or supporting objects in a hole of a structure.

It is a further object of the present invention to provide a hole bracket that is inexpensive to manufacture.

It is another object of the present invention to provide a hole bracket that is adapted to hold valve extenders and air hoses on vehicle wheels.

It is yet another object of the present invention to provide a hole bracket that is simple to assemble, install, and remove from a hole.

It is another objective of the present invention to provide a hole bracket that is adjustable to allow the bracket to be used with different sized holes.

It is a further objective of the present invention to provide a hole bracket that is adapted to hold a valve extender or air hose on a vehicle wheel and provides support when a user is testing air pressure or adjusting the amount of air in a tire.

These and other objects of the present invention may be realized by reference to the remaining portions of the specification, claims, and abstract.

2. Brief Description of the Invention

In accordance with the objects of the present invention, a hole bracket is provided that is adapted to hold and support a variety of objects in a hole of a structure. The present invention may be used with a large variety of holes and structures, however, the present invention is particularly well adapted for use with hand holes on large vehicle wheels.

The hole bracket of the present invention comprises first and second bracket members. The first and second bracket members may be, but are not required to be, substantially identical so that they may be more efficiently manufactured. The bracket members may be made from a variety of materials, such as steel or plastic, and they are preferably thin and flexible.

Each bracket member has a first end, a second end, and a central portion. A hook is attached to the first end for engaging and holding the edge of a hole. The hook may take a variety of shapes so that it may efficiently grasp and hold a variety of hole edges.

A tab is attached to the second end of the bracket member for attaching the bracket member to another bracket member. The tab extends some distance away from the end of the bracket member so that it may be inserted into a hole. At least one tab hole is provided on the central portion of each bracket member to receive the tab from the other bracket member. A number of tab holes may be provided to allow the hole bracket to be adjusted to fit holes of different sizes.

The hole bracket is assembled by inserting the tab of the first bracket into the tab hole of the second bracket and inserting the tab of the second bracket into the tab hole of the first bracket. In this way, the bracket members interlock with the central portions at least partially overlapping. The tabs of the bracket members may be bent upwards or downwards to make it easier to insert the tabs into the tab holes.

Once the hole bracket is assembled, it is attached to a hole by first flexing or bending the bracket to reduce the distance between the two hooks and reduce the length of the hole bracket. The bracket is then inserted into a hole and partially unflexed so that the hooks become seated on the edge of the hole. Preferably, the distance between the hooks when the bracket is in its relaxed state is greater than the diameter of the hole so that the hole bracket is held in a state of tension when in the hole. The tension provides a spring force on the hooks that prevents the hooks from disengaging the edge of the hole. The hole bracket is removed from the hole by flexing the bracket so that the hooks disengage the edge and moving the bracket out of the hole.

The design of the hole bracket allows a user to press upon objects attached to the hole bracket and receive a counter force. If a valve extender is attached to the hole bracket, a user can press on the valve extender to check and adjust tire pressure. Because the hole bracket is maintained in a state of tension, the central portion of the bracket is stiff and provides resistance.

The above description sets forth, rather broadly, the more important features of the present invention so that the detailed description that follows may be better understood and the contributions of the present invention to the art may be better appreciated. There are additional features of the invention that will be described below which will form the subject matter of claims appended hereto. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 4 is a semi-cross sectional side view of the hole bracket of the present invention as it would be inserted into a hole.

FIG. 5 is a semi-cross sectional side view of the hole bracket of the present invention attached to a hole in a structure with an object attached to the hole bracket.

Figure 1:
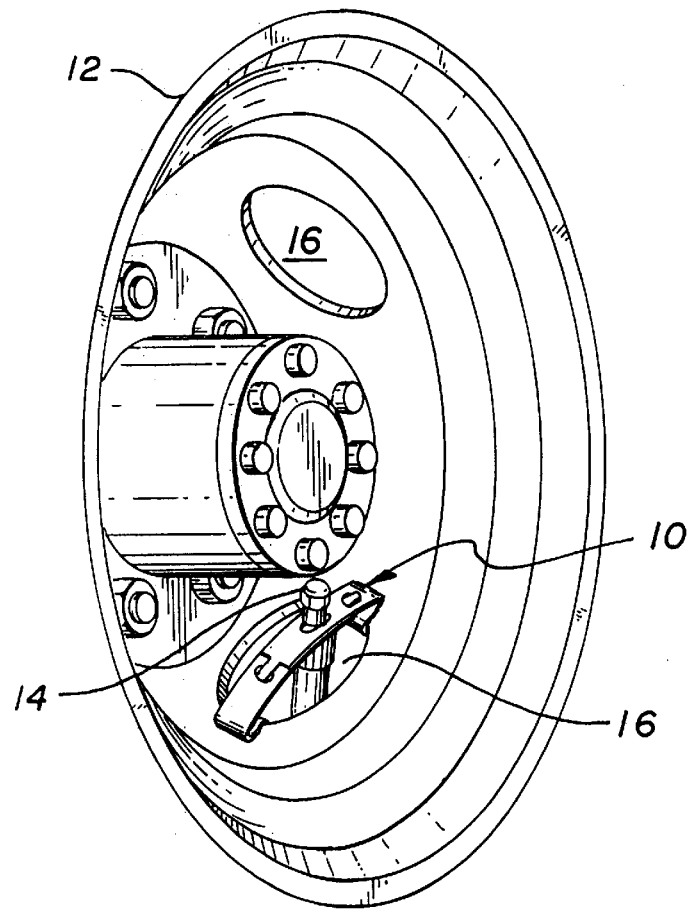
FIG. 1 is substantially a perspective view of the hole bracket of the present invention attached to a vehicle wheel.

REFERENCE NUMERALS 10 hole bracket
12 wheel
14 valve extender
16 hole
30 bracket member
32 first end
34 second end
36 central portion
38 hook
40 tab
42 tab holes
44 object hole
46 stiffener
50 edge

DESCRIPTION OF THE PREFERRED EMBODIMENT

As seen in FIG. 1, the present invention comprises a hole bracket 10 that is used to hold and support an object in a hole 16 of a structure. The present invention may be used with many different kinds of structures and objects. The structure shown in FIG. 1 is a vehicle wheel 12 with hand holes 16. In this application, hole bracket 10 may be used to hold valve extender 14.

Figure 3:
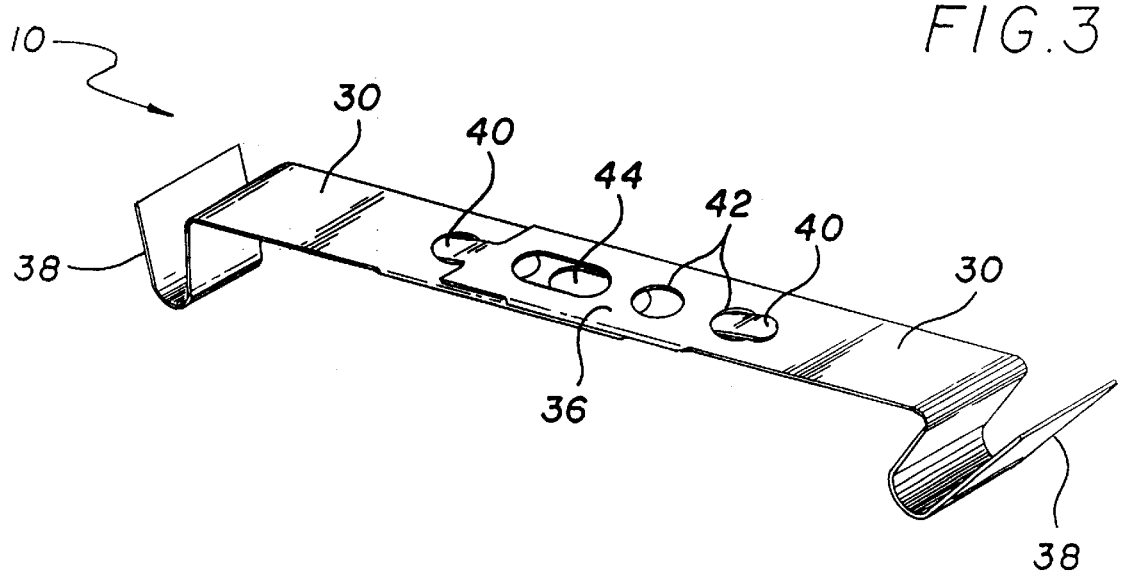
FIG. 3 is a perspective view of the hole bracket of the present invention with the bracket members attached to each other.
Figure 2A:
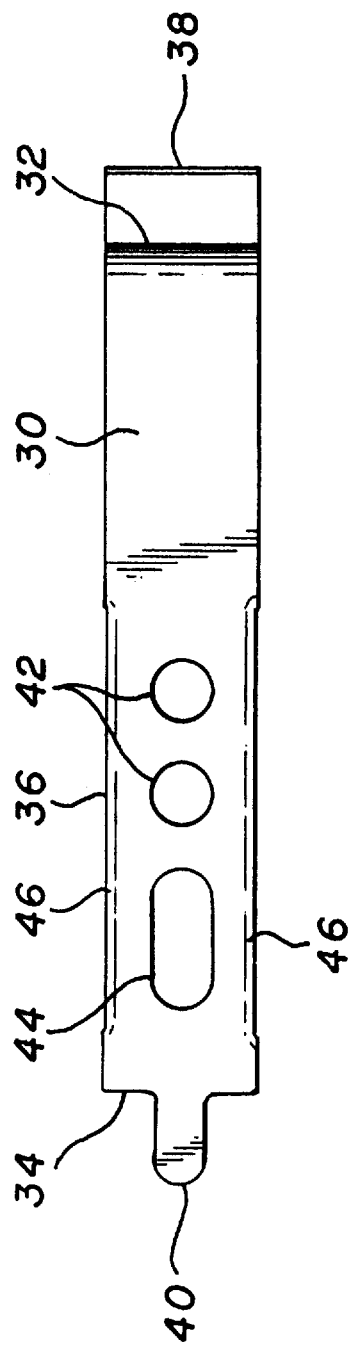
FIG. 2(A) is substantially a top view of a bracket member of the hole bracket of the present invention.
Figure 2B:
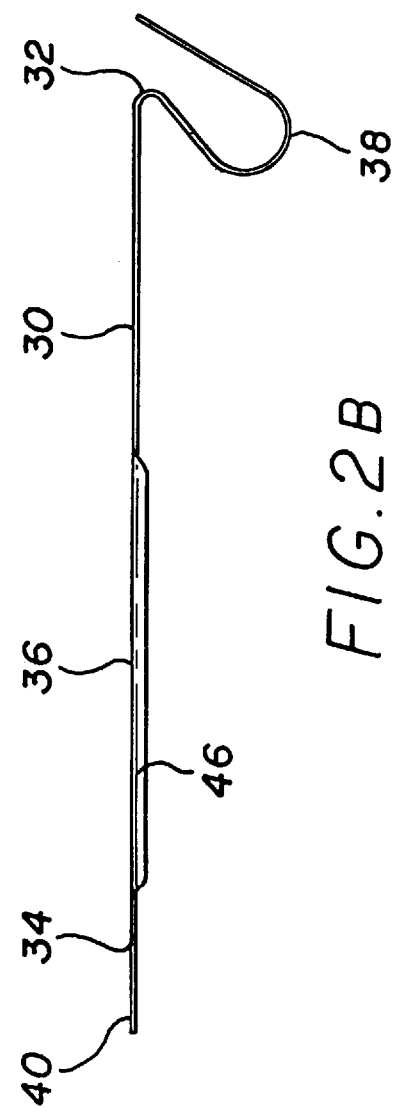
FIG. 2(B) is substantially a side view of a bracket member of the hole bracket of the present invention.

As seen in FIGS. 2(A), 2(B), and 3, the present invention comprises first and second bracket members 30. Preferably, the bracket members are substantially identical, having the same shape and structure. This allows the same manufacturing process and tools to be used to produce both the first and second bracket members of each hole bracket. Alternatively, bracket members 38 may be fashioned differently to fit on a hole of an irregular shape or to perform in a particular way.

Each bracket member comprises a first end 32, a second end 34, and a central portion 36. A hook 38 is attached to first end 32 for grasping the edge of a hole. Hook 38 may be fashioned in a number of different designs to efficiently grasp hole edges.

A tab 40 is attached to second end 34 of each bracket member 30. Tab 40 is intended to be inserted into a tab hole on another bracket member. Tab holes 42 are provided on central portion 36 of each bracket member 30 for receiving a tab from another bracket member. A plurality of holes 42 are provided to allow the hole bracket 10 to be adjusted for holes of different dimensions. However, a single tab hole 42 may be provided if no adjustment is needed.

An object hole 44 is provided on each bracket member 30 for allowing objects to be attached to hole bracket 10. When two bracket members 30 are attached together, the holes 44 are aligned so that an object can be inserted through both holes and attach to hole bracket 10. Object hole 44 may be oblong to allow the holes to align when two or more tab holes are provided. A portion of object hole 44 on a first bracket will align with a portion of object hole 44 on a second bracket even when hold bracket 10 is adjusted for different lengths. In an alternative design, no hole 44 is provided and an alternative means, such as a clamp or screw, is used for attaching objects to hole bracket 10.

FIG. 3 illustrates how two bracket members 30 are attached together. Tab 40 of the upper bracket member is inserted into tab hole 42 of the lower bracket member 30 and tab 40 of the lower bracket member is inserted into tab hole 42 of the upper bracket member. In this way, the two bracket members 30 are interlocked and the central portions 36 overlap.

Stiffeners 46 may be provided on central portion 36 of each bracket member 30 to provide stiffness to the bracket. Stiffeners 46 may comprise a section of central portion 36 that is bent downward or upward.

As seen in FIG. 4, hole bracket 10 is inserted into hole 16 of a structure 12 by first bending or flexing hole bracket 10. This reduces the distance between hooks 38 so that most of hole bracket 10 may be inserted into hole 16. Once hole bracket 10 is properly positioned, hole bracket 10 is unbent or relaxed so that hooks 38 are seated on edge 50 of hole 16.

As seen in FIG. 5, the length of hole bracket 10 in its unflexed or relaxed state is preferably longer than the diameter of hole 16. This maintains hole bracket 10 in a state of tension when bracket 10 is installed so that hooks 38 are prevented from disengaging edge 50.

Once hole bracket 10 is properly installed in a hole, an object may be attached to the bracket. In FIG. 5, a valve extender 14 is attached to hole bracket 10 by inserting the stem of the valve extender through object holes 44 of the bracket members 30. Because hole bracket 10 is held in a state of tension, hole bracket 10 is stiff and a resistive force is provided when a user presses upon valve extender 14.

Hole bracket 10 is preferably made of a flexible material that is durable and corrosion resistant. For example, hole bracket 10 may be made from steel or plastic. Stainless steel is preferred for use with vehicle wheels because of its corrosion resistant properties and because hole bracket 10 may be easily and inexpensively manufactured through stamping and pressing operations.

SUMMARY

It may now be seen that the present invention comprises a hole bracket that may be used to hold objects in a hole on a structure. The hole bracket is particularly well adapted for use on vehicle wheels for holding valve extenders and air hoses. The hole bracket is inexpensive to manufacture and simple to assemble, install, and remove. Moreover, the hole bracket is light, durable, and reliable.

Although the description above contains many specifications, these should not be construed as limiting the scope of the invention but as merely providing illustrations of some of presently preferred embodiments of this invention. For example, the number of holes and the shape of the hooks may be varied to achieve different results, yet still achieving the objects of the present invention. Thus, the scope of the invention should be determined by the appended claims and their legal equivalents rather than by the examples given.

What is claimed is:

1. A hole bracket for supporting an object in a hole in an apparatus, the hole being defined by an edge portion surrounding the hole and having a first side opposite a second side with each of said sides extending outwardly from the hole, the hole bracket comprising in combination:
   (A) a first bracket member, comprising:
      (a) a first and second end and a central portion;
      (b) a first hook attached to said first end in the first bracket member, said first hook having opposing arms adapted to fixedly clamp the first and second sides of the edge portion of the apparatus;
      (c) a first tab attached to the second end in the first bracket member for attaching said first bracket member to a second bracket member; and
      (d) at least one tab hole in said central portion of the first bracket member for attaching said first bracket member to another bracket member; and
   (B) the second bracket member comprising:
      (a) a first and second end and a central portion;
      (b) a second hook attached to said first end in said second bracket member, said second hook also having opposing arms adapted to fixedly clamp the first and second sides of the edge portion of the apparatus;
      (c) a second tab attached to the second end of the second bracket member for attaching said second bracket member to the first bracket member;
      (d) at least one tab hole in said central portion of the second bracket member for attaching said first bracket member to the first bracket member;
the first tab penetrating and abutting tab hole in the second bracket member and the second tab penetrating and abutting the tab hole in the first bracket member in order to fix the length of the interconnected first and second bracket members and thereby bias the first and second hooks fixedly against the edge of the hole.

2. The hole bracket of claim 1 further comprising an object hole for receiving the object.

3. The hole bracket of claim 2 wherein said object hole comprises an object hole in said first bracket member and an object hole in said second bracket member, wherein said object holes in said first and second bracket members are aligned when said first and second bracket members are attached together.

4. The hole bracket of claim 3 wherein at least one of said object holes in said bracket members is oblong.

5. The hole bracket of claim 1 wherein at least one of said first and second bracket members comprises a flexible material and the first and second bracket members are secured in place in the hole by bending at least one of said bracket members to thereby bias the first and second hooks against the edge of the hole.

6. The hole bracket of claim 5 wherein said flexible material comprises plastic.

7. The hole bracket of claim 5 wherein said flexible material comprises metal.

8. The hole bracket of claim 1 wherein said first and second bracket members comprise a plurality of tab holes in said central portions for allowing a plurality of different lengths of said bracket to be achieved.

9. A hole bracket for attaching an object to a structure with hole, the hole being defined by an edge, the bracket comprising:
   (A) first and second interlocking bracket members, each of said members comprising:
      (a) a first end, a second end, and a central portion;
      (b) a hook attached to said first end;
      (c) at least one tab attached to said second end; and
      (d) at least one tab hold in said central portion;
wherein said first and second member are attached together by inserting said tab of said first member into said tab of said second member and inserting said tab of said second member into said tab hole of said first member to thereby fix the length of the bracket, wherein said hooks hold said bracket on the edge of the hole when the bracket is inserted into the hole by bending the bracket to fit within the hole and have the hooks fixedly engage the edge of the hole by the biasing force of the bent bracket against the hooks and the edge.

10. The hole bracket of claim 9 wherein the distance between said hooks when said first and second members are attached together is longer than a diameter of the hole.

11. The hole bracket of claim 9 wherein each of said members comprises a plurality of holes in said central potion for adjusting the distance between said hooks.

12. The hole bracket of claim 9 wherein each of said bracket members is flexible so that the first and second bracket members are secured in place in the hole by bending said bracket members to thereby locate and bias the hooks to abut the edge of the hole.

13. The hole bracket of claim 9 further comprising an object hole for receiving an object.

14. The hole bracket of claim 13 wherein said object hole comprises an object hole in both said first and second bracket members.

15. The hole bracket of claim 9 wherein at least one of said first and second bracket members comprises a stiffener for stiffening said bracket member.

16. The hole bracket of claim 15 wherein said stiffener comprises a bent portion.

17. The hole bracket of claim 15 wherein said stiffener is on said central portion.

18. A method of attaching a hole bracket to a structure, the structure having a hole defined by an edge, the hole bracket comprising a first and second member, said first and second members having hooks, the method comprising the following steps:
   (A) attaching the first and second members together to form the hole bracket;
   (B) bending the hole bracket;
   (C) inserting the hole bracket into a hole on a vehicle wheel;
   (D) unbending the hand hole bracket; and
   (E) seating the hooks on the edge of the hole.

19. The method of claim 18 wherein the first member comprises a tab and a tab hole and the second member comprises a tab and a tab hole, wherein the step of attaching the first and second members together comprises:
   (A) inserting the tab of the first member into the tab hole of the second member; and (B) inserting the tab of the second member into the tab hole of the first member.

20. The method of claim 18 wherein the hole bracket comprises an object hole for attaching an object to the hole bracket, further comprising the following step:

(A) inserting an object into the object hole.

21. A bracket for supporting an object in a structure hole in a structure, the hole being defined by an edge in the structure, the bracket comprising in combination a first member removably attached to a second bracket member, each of said bracket members having an edge hook, and at least one of said bracket members being adapted to be bent sufficient to allow the edge hooks to each seat on the edge of the structure hole and secure the bracket in place on the edge by the spring force provided by the bent first and second members.

22. The bracket of claim 21 wherein the bracket has an object hole for mounting an object within the object hole and securing the object in position within the structure hole.

23. The bracket of claim 22 wherein each bracket member includes a tab and tab hole, the tab in the first bracket member penetrates the tab hole in the second bracket member, and the tab in the second bracket member penetrates the tab hole in the first bracket member to thereby fix the size of the bracket with respect to the structure hole.

24. The bracket of claim 22 wherein the structure is a dual wheel assembly having a first and a second wheel, the second wheel includes the structure hole, and the object includes a valve stem extending from the first wheel through the structure hole in the second wheel.

25. The bracket of claim 21 wherein the structure is a dual wheel assembly having a fist and a second wheel, the second wheel includes the structure hole, and the object includes a valve stem extending from the first wheel through the structure hole in the second wheel.

26. The bracket of claim 23 wherein the structure is a dual wheel assembly having a first and a second wheel, the second wheel includes the structure hole, and the object includes a valve stem extending from the first wheel through the structure hole in the second wheel.

* * * * *